Aug. 17, 1937.  G. HOMEY  2,090,415
METHOD OF AND APPARATUS FOR MANUFACTURING WOODEN VESSELS
Filed March 30, 1933
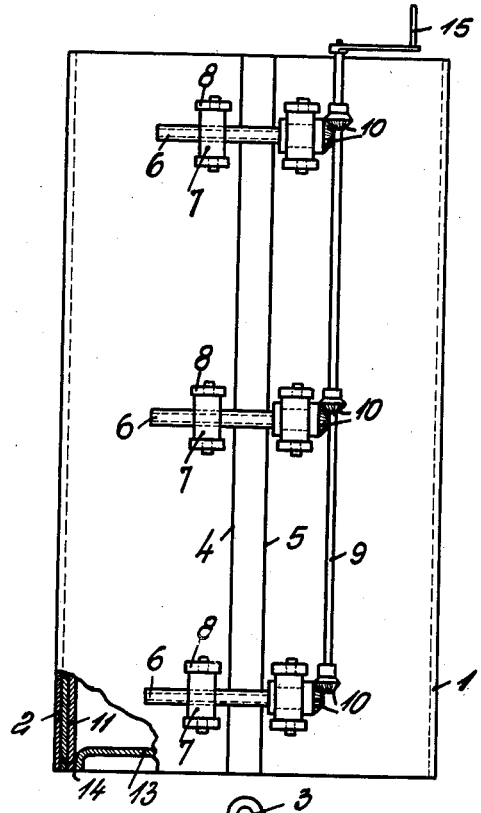
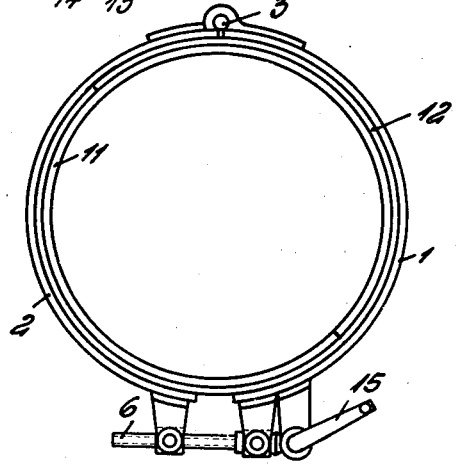
Inventor
Gerhard Homey
by
W. E. _____,
Attorney.

Patented Aug. 17, 1937

2,090,415

UNITED STATES PATENT OFFICE 2,090,415

METHOD OF AND APPARATUS FOR MANUFACTURING WOODEN VESSELS

Gerhard Homey, Cologne, Germany

Application March 30, 1933, Serial No. 663,522
In Germany July 5, 1932

3 Claims. (Cl. 144—309)

A process for producing buckets, casks and the like vessels from pressed wood and plywood in which the apparatus employed comprises a press mould, a press plunger and a bottom former, is described in the United States Patent No. 1,823,-102. The plunger presses the parts forming the walls of the vessel while at the same time the clamping blocks forming the bottom former are pressed against the downwardly extending flange of the bottom of the vessel thus producing the joint between the bottom and walls of the vessel.

These appliances are relatively expensive because of the tools required and the invention has among its objects to assemble the parts forming the vessel by simpler means.

According to the invention the press is replaced by one or a number of clamping devices, for joining the walls of the vessel, bent to the form of a circle, to the flanged edge of the bottom or top. The layer of plywood forming the inner wall of the vessel has its abutting edges pressed together by the action of the clamping mould so that it exerts a radially outwardly directed pressure upon the outer layer of the plywood forming the external wall of the vessel whereby the outer and inner layers of the material between which glue or other adhesive has been previously applied are held tightly together and become intimately glued together. Thus a cylindrically or conically-shaped casing is produced. To complete the vessel pressure is applied to the flanged edge of the bottom to glue it on the surface of the inner wall of the vessel, so that thus the forming of the sides and the gluing of the bottom are effected simultaneously.

Apparatus for carrying out the operations according to the invention is illustrated in the accompanying drawing.

Figure 1 shows the apparatus in front elevation, and

Figure 2 is a corresponding plan.

The apparatus according to the invention consists of a cylindrical clamping device formed of the parts 1 and 2 which are connected together by a hinge 3. The abutting edges 4 and 5 of the clamping cylinder 1, 2 are forced together and forced apart by means of screw-threaded spindles 6. These are mounted in axially rotatable nuts 7 resting in extension members 8. The spindles 6 are driven by a single shaft 9, which can be rotated by means of a crank 15. The rotary movement is imparted to the spindles 6 by means of pairs of bevel wheels 10.

The apparatus works as follows:

The sections of board to form the sides of the vessel are inserted into the open clamping cylinder 1, 2, advantageously in such manner that the abutting edges of the inner layer of board 11 and the abutting edges of the outer layer of board 12 are relatively staggered. The bottom 13 is then placed in position with its flanged edge 14 directed downwardly, whereupon by rotating the spindle 9, the abutting edges 4 and 5 of the clamping cylinder 1, 2 are caused to approach each other. In this way the abutting edges of the inner layer of board 11 are forced together just as are those of the outer layer of board 12. The tension thus imparted to the inner board acts radially on the whole periphery and at the same time the inner board presses closely against the inner surface of the outer layer of board 12. Simultaneously with this clamping action the flanged edge 14 of the bottom 13 is likewise stressed, so that the bottom 13 causes the tension imparted to it to act outwardly as in the case of the inner layer or board 11 and at the same time is tightly glued thereto. The plywood having been heated by any suitable means, the removal of the cylinder with the bottom attached is effected very quickly. When the glue has set, the clamping cylinder is loosened and the glued vessel can be removed. Heating can be effected in the use of coils of piping, or it can be effected electrically in the use of resistances; it may, however, be effected by placing the whole cylinder in a chamber to which heat can be applied.

The invention is not confined to the example described and illustrated. For instance instead of a bottom only, a lid and bottom may be fitted in the same operation so that a completely closed vessel is obtained. Instead of the cylinder, single clamping rings may be employed.

I claim:

1. Apparatus for producing vessels from pressed wood or ply wood, comprising a clamping mould formed in two parts substantially semicircular in cross-section, the two parts being hingedly connected together along adjacent longitudinal edges, and tensioning devices consisting of clamping screws and elements adapted to engage the clamping screws respectively applied upon the adjacent edges of the parts of the clamping mould and a common operating spindle to effect the rotation of the clamping screws, the said clamping mould being applied to embrace a plurality of layers of the pressed wood or ply wood forming the peripheral wall of the vessel so that by means of the tensioning devices pressure may be exerted upon the said layer towards the axis of the vessel by the parts of the clamping mould.

2. The method of producing vessels having peripheral walls composed of layers of pressed wood or ply-wood which comprises arranging inner and outer layers of such material in an exterior constraining device adapted to compress the layers radially inward, to form the peripheral wall of the vessel, said layers having adhesive on their coengaging surfaces and the inner layer being unsupported on its inner side and having its lateral edges adapted to abut one another when the layers are contracted by such compression, arranging within the peripheral wall an end plate of pressed wood or ply-wood having adhesive applied to its edge, and constraining the layers substantially into the size and shape of the peripheral wall of the vessel to be formed, thereby forcing the lateral edges of the inner layer into abutting relation and compressing the outer layer against the unsupported inner layer to effect consolidation of said layers and the union of the peripheral wall with said end plate.

3. The method of producing vessels having peripheral walls composed of layers of pressed wood or ply-wood which comprises arranging inner and outer layers of such material in an exterior constraining device adapted to compress the layers radially inward, to form the peripheral wall of the vessel, said layers having adhesive on their coengaging surfaces and the inner layer being unsupported on its inner side and having its lateral edges adapted to abut one another when the layers are contracted by such compression, arranging end plates of pressed wood or ply-wood within the peripheral wall at its opposite ends, said plates having adhesive applied to their edges, and constraining the layers substantially into the size and shape of the peripheral wall of the vessel to be formed, thereby forcing the lateral edges of the inner layer into abutting relation and compressing the outer layer against the unsupported inner layer to effect consolidation of said layers and the union of the peripheral wall with said end plates.

GERHARD HOMEY.